3,664,674
SPLIT HOUSING WITH IMPROVED SEAL
Frank A. Yehl, Allegany, N.Y., assignor to
Dresser Industries, Inc., Dallas, Tex.
Filed Apr. 22, 1970, Ser. No. 30,729
Int. Cl. F16j 9/00
U.S. Cl. 277—66                                    7 Claims

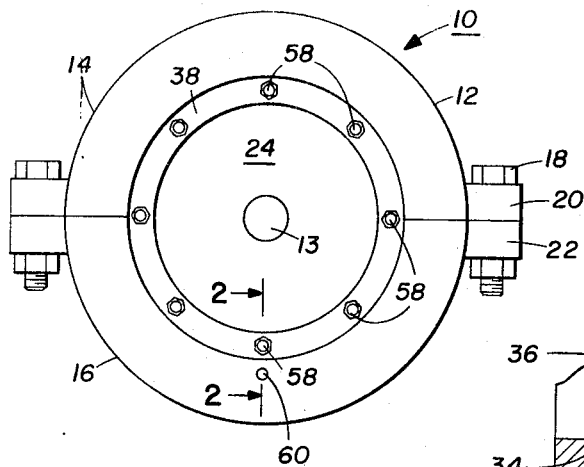
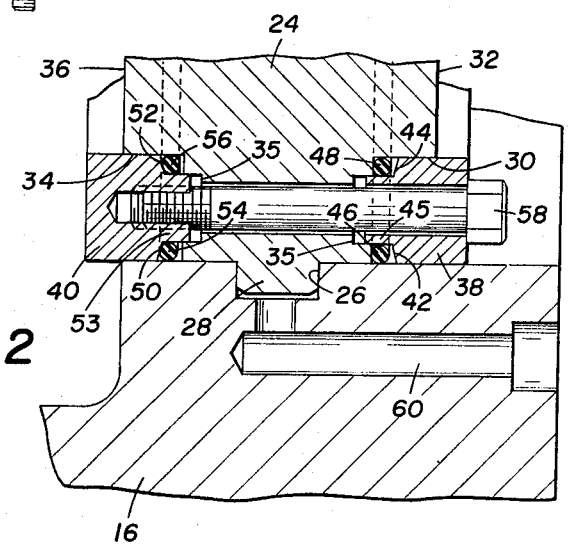
May 23, 1972 — F. A. YEHL — 3,664,674
SPLIT HOUSING WITH IMPROVED SEAL
Filed April 22, 1970
FIG. 1
FIG. 2
FIG. 3
FIG. 4
INVENTOR
FRANK A. YEHL
Roy L. Van Winkle
ATTORNEY United States Patent Office 3,664,674
Patented May 23, 1972

ABSTRACT OF THE DISCLOSURE

A split housing including improved sealing means forming a fluid-tight seal between a circular end member and a pair of mating semicylindrical housing or casing members. The improved housing/sealing arrangement includes an end plate, a split casing such as is utilized on high pressure, turbine-type compressors, an annular member carrying a deformable seal having a diameter less than the inner diameter of the casing and means for deforming the seal into sealing engagement with the end plate and casing.

BACKGROUND OF THE INVENTION

This invention relates generally to an improved sealed housing wherein a fluid-tight seal is formed between an end plate and split housing members. More particularly, but not by way of limitation, this invention relates to an improved sealing arrangement for forming a fluid-tight seal between a circular end member and semicylindrical housing members wherein the fluid-tight seal is subjected to a differential in pressure from within the housing.

Various means have been utilized in the past in an attempt to consistently provide a fluid-tight seal between the circular end member and the semicylindrical casing members of the housing. These attempts have not been entirely satisfactory.

One procedure that has been utilized, is to locate an O-ring seal around the periphery of the end member. The O-ring seal of that arrangement must have an outer diameter that is greater than the inner diameter of the assembled housing members so that the housing members, when bolted together, sealingly engage the O-ring. When the end member with the seal thereon is placed in position in one of the semicylindrical housing members, the O-ring is deformed and extrudes into the portion of the end member that is not in engagement with the housing member and, thus, bunch up and, in general, loosely fit the end member. When the mating housing member is assembled thereon, the O-ring seal is most often cut or damaged to the extent that it does not form a fluid-tight seal between the end member and the housing member last assembled.

SUMMARY OF THE INVENTION

Improved housing apparatus comprising a circular end member having inner and outer faces, a pair of mating semicylindrical housing members, each having a recess for receiving the end member, and sealing means for forming a continuous, fluid-tight seal between the assembled end and housing members. The sealing means includes a deformable annular seal member encircling the end member, the seal member being of smaller diameter than the inner diameter of the assembled housing members, and deforming means engageable with the seal member for deforming the seal member into fluid-tight sealing engagement with the assembled end and housing members.

One object of this invention is to provide an improved housing/seal arrangement that will consistently form a fluid-tight seal between an end member and the assembled semicylindrical members forming the housing.

Another object of the invention is to provide an improved housing/sealing arrangement for use in the split housing wherein the possibility of damaging the seal during assembly is eliminated.

A further object of the invention is to provide an improved housing/sealing arrangement that can be quickly and easily actuated from the exterior of the housing after assembly of the housing to provide the desired fluid-tight seal between the end plate and housing members.

The foregoing objects and advantages of the invention will become more apparent as the following detailed description is read in conjunction with the accompanying drawings wherein like reference characters denote like parts in all views.

BRIEF DESCRIPTION OF THE DRAWINGS

FIG. 1 is an end view of a housing having semicylindrical housing members, a circular end member and the sealing means therein.

FIG. 2 is an enlarged cross sectional view taken substantially along the line 2—2 of FIG. 1, but showing the seals in an undeformed condition.

FIG. 3 is a cross sectional view similar to FIG. 2, but showing the seals deformed into fluid-tight sealing engagement with the end and outer housing members.

FIG. 4 is a cross sectional view, similar to FIG. 2, but showing a modified form of the housing/sealing apparatus.

DETAILED DESCRIPTION OF THE PREFERRED EMBODIMENT

Referring to the drawing and to FIG. 1 in particular, shown therein and generally designated by the reference character 10, is a turbo-compressor embodying the invention described and claimed hereinafter. The turbo-compressor 10 includes a housing 12 that journals a turbine rotor (not shown). A shaft 13 that forms a portion of the rotor can be seen in FIG. 1.

The housing 12 includes a pair of mating semicylindrical housing members 14 and 16 that are interconnected when assembled by a plurality of bolts 18 that extend through axially extending flanges 20 and 22 carried respectively by the housing members 14 and 16. Although not illustrated, the members 14 and/or 16 will be provided with inlet and outlet passageways.

The housing 12 also includes a pair of end plates 24. (Only one plate 24 can be seen in FIG. 1.) The end plates 24 carry the bearings (not shown) which rotatably support the rotor shaft 13.

As can be seen more clearly in FIG. 2, the housing members 14 and 16 include an annular recess 26 that is sized to receive a peripheral flange 28 formed on the end plates 24. When the peripheral flange 28 is located in the annular recess 26, the end plate 24 is securely locked against axial movement with respect to the housing members 14 and 16.

The end plate 24 is provided with an annular groove 30 formed in an outer face 32 of the plate 24 and with an annular groove 34 formed in an inner face 36 of the plate 24. The annular grooves 30 and 34 each include a smaller annular groove 35 and are arranged to receive annular members 38 and 40 respectively.

As clearly shown in FIG. 2, the inner surface of the annular member 38 is provided with a groove 42 adjacent its outer periphery and with a groove 44 located adjacent its inner periphery forming an annular flange 45 receivable in one groove 35. The annular groove 42 is sized to receive a deformable O-ring seal 46 that has an outer diameter less than the inner diameter of the assembled housing members 14 and 16 for reasons that will be explained hereinafter. The groove 44 is sized to receive a deformable O-ring seal 48. Preferably, at least one surface in each of the grooves 52 and 44 is slightly tapered as illustrated in FIG. 2.

The annular member 40 is similarly provided with an annular groove 50 in its outer periphery and an annular groove 52 formed in its inner periphery forming an annular flange 53 receivable in the other groove 35. The grooves 50 and 52 are sized to receive O-ring seals 54 and 56. The O-ring seal 54 has an outside diameter less than the inner diameter of the assembled housing members 14 and 16. It will be noted that the grooves 42, 44, 50 and 52 are positioned adjacent the end plate 24 when the annular members 38 and 40 are assembled in the housing 12.

A plurality of threaded fasteners 58 extend through the annular member 38 and the end plate 24 into threaded engagement with the annular member 40. The fasteners 58 are located between the seals 46 and 48 and between the seals 54 and 56. The arrangement is such that tightening of the fasteners 58 moves the flanges 45 and 53 on the annular members 38 and 40 in the grooves 35 and relatively together to deform the seals.

When it is desired to assemble the housing 12, the O-ring seals 46, 48, 54 and 56 are placed in the corresponding grooves in the annular members 38 and 40. The annular members 38 and 40 are then placed in the annular grooves 30 and 34, respectively, on the end plates 24 and held loosely thereon by the fasteners 58 in substantially the position illustrated in FIG. 2. Due to the length of the flanges 45 and 53, the seals are securely retained on the end plates 24 during assembly.

The end plates 24 are then placed on the shaft 13 of the turbine rotor. The turbine rotor and end plates 24 are lifted into position and set in the housing member 16 with the peripheral flanges 28 of the end plates 24 positioned in the recesses 26 of the housing portion 16. It is important to note that since the unstressed outer diameter of the O-ring seals 46 and 54 is less than the inner diameter of the housing members 14 and 16, the seals 46 and 54 are not deformed, that is, they are not distorted when the end plates 24 are positioned in the housing member 16.

After the end plates 24 are positioned in the housing member 16, the housing member 14 is lowered into position with the recess therein receiving the peripheral flange 28 of the end plates 24. The bolts 18 are inserted to securely join the housing members 14 and 16 and lock the end plates 24 in position.

Since the heads of the fasteners 58 are located on the exterior of the housing 12, the fasteners 58 can be readily rotated. Rotation of the fasteners 58 moves the annular members 38 and 40 relatively together exerting a force on the seals 46, 48, 54 and 56. The seals 46 and 54 are deformed into fluid-tight sealing engagement with the housing members 14 and 16 and with the end plates 24. The seals 48 and 56 are deformed into fluid-tight sealing engagement with the annular members 38 and 40 and with the end plates 24.

The quality of the seal formed can be quickly checked by applying pressure through passageway 60 which is in fluid communication with the seals adjacent the faces 32 and 36 of the end plates 24. This procedure avoids the necessity for filling the entire housing to check the seal.

Although not separately illustrated, a satisfactory seal may be obtained in many installations by the use of only the inner annular member 40 and its associated seals. In this instance, the outer annular member 38 may be completely eliminated if desired. The fasteners 58 are, of course, accessible from the exterior of the unit to deform the seals thereby affording the desired fluid-tight seal substantially as previously described.

Since the fasteners 58 extend between the seals 46, 54 and 48, 56, the interior of the housing is fluid-tight since no fluid can reach the fasteners 58 nor can fluid flow between the end plates 24 and the housing members 14 and 16. Thus, the particular housing and seal arrangement described, provides an efficient means for consistently forming a continuous annular seal between the end plates 24 and the housing members 14 and 16. Since the O-ring seals 46 and 54 have an outside diameter smaller than the inner diameter of the assembled housing members 14 and 16, no extrusion of the seals occurs and, therefore, the seals are not subject to cutting or pinching during the assembly of the housing 12.

DETAILED DESCRIPTION OF THE MODIFICATION OF FIG. 4

FIG. 4 illustrates a modification of the housing structure described in connection with FIGS. 1 through 3. The modification concerns only the end plate and the sealing arrangement. The same reference characters are used in FIGS. 1 through 3 in connection with parts not modified.

As shown in FIG. 4, the recess 26 in the housing member 16 receives a peripheral flange 128 that is formed on end plate 124. The end plate 124 also includes an annular groove 130 that is formed in an outer face 132 thereon.

An annular member 138 is positioned in the annular groove 130 in the end plate 124. The annular member 138 has a small annular groove 142 formed in its periphery adjacent the end plate 124 for receiving a deformable O-ring seal 146. The O-ring seal 146 has an unstressed outside diameter that is less than the inner diameter of the housing members 14 and 16 so that the seal 146 does not engage the housing member during initial assembly.

A plurality of threaded fasteners 158 extend through the annular member 138 into threaded connection with the end plate 124. Tightening of the fasteners 158 forces the annular member 138 toward the end plate 124. As the threaded fasteners 158 are rotated and the annular member 138 moves toward the end plate 124, the O-ring seal 146 is deformed into fluidtight sealing engagement with the housing members 14 and 16 and with the end plate 124.

Since the fasteners 158 do not extend through the end plate 124, it is not necessary to provide a seal within the bolt circle formed by the fasteners 158. As previously mentioned in connection with the embodiment of FIG. 1, the O-ring seal 146, due to its outside dimension, will not be extruded on assembly with the housing member 16. Therefore, the seal 146 is not subject to pinching or buckling during assembly of the housing member 14 with the housing member 16 and the end plate 124. It will also be noted that the deformation of the seal 146 into its fluid-tight seal engagement can be accomplished from the exterior of the housing 12 and, thus, can be quickly and easily accomplished after the housing 12 has been assembled.

It will be understood that the embodiments described hereinbefore are presented by way of example only and that many modifications and changes can be made thereto without departing from the spirit of the invention.

The embodiments of the invention in which an exclusive property or privilege is claimed are defined as follows:

1. Housing apparatus comprising:
   a circular end member having inner and outer faces;
   a pair of mating semicylindrical housing members each having a recess spaced from the end of said housing members for receieving said end member, said recesses forming surfaces abutting the inner and outer faces of said end member to prevent axial movement of said end member relative to said housing members when said end member is located in said recesses; and,
   sealing means for forming a continuous, fluid-tight seal between the assembled end and housing members, said sealing means including
      a deformable annular seal member encircling said end member, said seal member being of smaller diameter than the inner diameter of the assembled housing members, and
   deforming means engageable with said seal member for deforming said seal member into fluid-tight sealing engagement with the assembled end and housing members.

2. The apparatus of claim 1 wherein said deforming means includes:
an annular member having an outside diameter substantially equal to the inner diameter of said housing members, said annular member having an annular groove in its periphery adjacent one face of said end member carrying said seal member; and,
fastening means for connecting said annular member to said end member and for exerting a force on said seal member to deform said seal member into sealing engagement with said end and housing members.

3. Housing apparatus comprising:
a circular end member having inner and outer faces;
a pair of mating semicylindrical housing members each having a recess for receiving said end member; and,
sealing means for forming a continuous, fluid-tight seal between the assembled end and housing members, said sealing means including:
first and second deformable annular seal members encircling said end member, each said seal member being of smaller diameter than the inner diameter of the assembled housing members,
first and second annular members located adjacent the inner and outer faces of said circular end members, each said annular member having annular grooves in its periphery adjacent a respective face of said end member, said annular groves being sized to receive said seal members,
fastening means for connecting said first and second annular members to said end member and for exerting a force on said seal members to deform said seal members into sealing engagement with said end and housing members.

4. The apparatus of claim 3 wherein:
said end member has an annular peripheral groove adjacent each face and said annular members are located therein; and,
said fastening means interconnects said annular members for exerting a simultaneous force on said seal members to form a fluid-tight seal between each face of said end member and the assembled housing members.

5. The apparatus of claim 4 wherein:
each of said annular members has a second annular groove located adjacent said end member and inwardly of said fastening means; and,
said apparatus includes an additional deformable annular seal member located in each of the second annular grooves in said annular members, said additional deformable annular seals engaging said end members to form fluid-tight seals between said end member and said annular members.

6. Housing apparatus comprising:
a circular end member having inner and outer faces;
a pair of mating semicylindrical housing members each having a recess for receiving said end member; and,
sealing means for forming a continuous, fluid-tight seal between the assembled end and housing members, said sealing means including:
first and second deformable annular seal members encircling said end member, both of said seal members being of smaller diameter than the inner diameter of the assembled housing members,
an annular member having an outside diameter substantially equal to the inner diameter of said housing members, said annular member having first and second annular grooves in its inner and outer peripheries adjacent one face of said end member, said first and second seal members being located in said first and second annular grooves respectively, and
fastening means for connecting said annular member to said end member and for exerting a force on said seal members to deform said first seal member into sealing engagement with said end and housing members to deform said second seal member into sealing engagement with said annular member and end member, said fastening means being located between said seal members.

7. In the apparatus of claim 6 wherein:
said end member includes a peripheral flange; and,
the recesses in said housing members are sized to receive said peripheral flange to prevent movement of said end member relative to said housing members when said end and housing members are assembled.

References Cited
UNITED STATES PATENTS 3,282,221 11/1966 Kilbane et al. _____ 308—187
2,791,194 5/1957 Janise _____ 277—120 X SAMUEL ROTHBERG, Primary Examiner U.S. Cl. X.R.

277—105, 187